US011120575B2

(12) United States Patent
Chen (10) Patent No.: US 11,120,575 B2
(45) Date of Patent: Sep. 14, 2021

(54) METHOD, APPARATUS AND MEDIUM FOR OBJECT TRACKING (71) Applicant: Beijing Xiaomi Intelligent Technology Co., Ltd., Beijing (CN)

(72) Inventor: Zhijun Chen, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 28 days.

(21) Appl. No.: 16/740,304

(22) Filed: Jan. 10, 2020

(65) Prior Publication Data

US 2021/0074019 A1 Mar. 11, 2021

(30) Foreign Application Priority Data

Sep. 11, 2019 (CN) .......................... 201910856388.8

(51) Int. Cl.
*G06T 7/00* (2017.01)
*G06T 7/73* (2017.01)
(Continued)

(52) U.S. Cl.
CPC ............ *G06T 7/75* (2017.01); *G06K 9/00744* (2013.01); *G06K 9/6262* (2013.01); *G06K 9/66* (2013.01);
(Continued)

(58) Field of Classification Search
CPC ............. G06T 7/75; G06T 2207/10016; G06T 2207/20081; G06T 2207/30201;
(Continued)

(56) References Cited

U.S. PATENT DOCUMENTS 9,760,806 B1   9/2017 Ning et al.
2020/0272148 A1* 8/2020 Karasev ............... G05D 1/0088
2021/0042530 A1* 2/2021 Kim .................... G06K 9/00671

FOREIGN PATENT DOCUMENTS

EP    3675035 A1 * 5/2018  ............. G06T 7/292
EP    3675035 A1    7/2020
WO   2019037498 A1   2/2019

OTHER PUBLICATIONS

Extended European Search Report in Application No. 20152286.9, dated Oct. 26, 2020.

(Continued)

*Primary Examiner* — Ping Y Hsieh
(74) *Attorney, Agent, or Firm* — Syncoda LLC; Feng Ma (57) ABSTRACT A method for object tracking includes: obtaining frames with a number of N of history images of the object; acquiring first predicted feature point information of each frame image by using first network models corresponding to each frame image in the frames with a number of N of history images, and acquiring second predicted feature point information of the each frame image by using second network models corresponding to each frame image; adjusting parameters of the first network model and parameters of the second network model based on the first predicted feature point information and the second predicted feature point information until the first network model and the second network model are trained completely; and performing tracking of the object by using the first completely trained network model and the second completely trained network model.

17 Claims, 5 Drawing Sheets (51) Int. Cl.
  *G06K 9/00*      (2006.01)
  *G06K 9/62*      (2006.01)
  *G06K 9/66*      (2006.01)

(52) U.S. Cl.
  CPC .............. *G06T 2207/10016* (2013.01); *G06T 2207/20081* (2013.01)

(58) Field of Classification Search
  CPC .......... G06T 2207/20084; G06T 7/246; G06K 9/00744; G06K 9/6262; G06K 9/66; G06K 9/00758; G06K 9/6256
  See application file for complete search history.

(56) References Cited

OTHER PUBLICATIONS

Jiao Jichao et al: "MagicVO: An End-to-End Hybrid CNN and Bi-LSTM Method for Monocular Visual Odometry", IEEE Access, vol. 7, Jul. 2, 2019, pp. 94118-94127, XPO11736351.

Wan Xingyu et al: "Multi-Object Tracking Using Online Metric Learning with Long Short-Term Memory", 2018 25TH IEEE International Conference on Image Processing (ICIP), IEEE, Oct. 7, 2018, pp. 788-792, XPO33454747.

* cited by examiner

METHOD, APPARATUS AND MEDIUM FOR OBJECT TRACKING

CROSS-REFERENCE TO RELATED APPLICATION

This application claims priority to Chinese Patent Application No. 201910856388.8 filed on Sep. 11, 2019, the disclosure of which is hereby incorporated by reference in its entirety.

BACKGROUND

Object tracking can refer to giving an initial state of the object in a first frame of a tracking video and automatically estimating a state of the target object in subsequent frames.

Human eyes can easily follow a particular target for a period of time. However, for a machine, this task is not simple, especially in the tracking process, there will be various complicated situations that the object is severely deformed, obstructed by other objects or similar objects interfere.

SUMMARY

The present disclosure relates generally to the field of image processing, and more specifically to a method, an apparatus and a medium for object tracking.

According to a first aspect of embodiments of the present disclosure, there is provided a method for object tracking, including:

obtaining frames with a number of N of history images of the object, wherein N is a natural number greater than or equal to 2;

acquiring first predicted feature point information of each frame image in the frames with a number of N of history images by using first network models corresponding to each frame image in the frames with a number of N of history images, and acquiring second predicted feature point information of each frame image by using second network models corresponding to each frame image;

adjusting parameters of the first network model and parameters of the second network model based on the first predicted feature point information and the second predicted feature point information until the first network model and the second network model are trained completely; and performing tracking of the object by using the first completely trained network model and the second completely trained network model.

Where frames with a number of N of history images at least includes a previous image frame and a current image frame, the sampling time of the previous image frame is earlier than the sampling time of the current image frame;

acquiring the first predicted feature point information of the each frame image in the frames with a number of N of history images by using the first network model corresponding to each frame image includes:

acquiring first predicted feature point information of the previous image frame by using a first network model corresponding to each previous image frame; and acquiring first predicted feature point information of the current image frame by using a first network model corresponding to each current image frame.

Where acquiring the second predicted feature point information of each frame image by using the second network model corresponding to each frame image includes:

acquiring loop information corresponding to the previous image frame via the second network model corresponding to each previous image frame based on the first predicted feature point information of the previous image frame; and inputting the loop information corresponding to the previous image frame and the first predicted feature point information of the current image frame into the second network model corresponding to each current image frame, to acquire the second predicted feature point information of the current image frame.

Where adjusting the parameters of the first network model and the parameters of the second network model based on the first predicted feature point information and the second predicted feature point information includes:

acquiring a position of a predicted feature point of the current image frame based on the first predicted feature point information of the current image frame and the second predicted feature point information of the current image frame;

acquiring a position of actual feature points based on the current image frame;

acquiring a predicted error of the current image frame based on a position of the predicted feature point and a position of the actual feature point; and adjusting the parameters of the first network model and the parameters of the second network model based on the predicted error.

Where acquiring the position of the predicted feature point of the current image frame based on the first predicted feature point information of the current image frame and the second predicted feature point information of the current image frame includes:

performing a weighted sum of a position of a first predicted feature point of the first predicted feature point information of the current image frame and a position of a second predicted feature point of the second predicted feature point information of the current image frame, and acquiring a position of a predicted feature point of the current image frame.

Where acquiring the predicted error of the current image frame based on the position of the predicted feature point and the position of the actual feature point includes:

calculating an error between the position of the predicted feature point of the current image frame and the position of the actual feature point to acquire a first error;

calculating an error between the position of the second predicted feature point of the current image frame and the position of the actual feature point to acquire a second error; and performing a weighted sum of the first error and the second error to acquire the predicted error of the current image frame.

According to a second aspect of the embodiments of the present disclosure, there is provided an apparatus for object tracking, including:

an image sampling unit configured to obtain frames with a number of N of history images of the object, wherein N is a natural number greater than or equal to 2;

first network models with a number of N, wherein each first network model is configured to acquire first predicted feature point information of each frame image corresponding to the first network model;

second network models with a number of N, wherein each second network model is configured to acquire second predicted feature point information of each frame image corresponding to each second network model;

model training unit configured to adjust parameters of the first network model and parameters of the second network model based on the first predicted feature point information and the second predicted feature point information until the first network model and the second network model are trained completely.

Where frames with a number of N of history images obtained by the image sampling unit at least includes a previous image frame and a current image frame, the sampling time of the previous image frame is earlier than the sampling time of the current image frame;

a first network model corresponding to each previous image frame is configured to acquire first predicted feature point information of the previous image frame; and a first network model corresponding to each current image frame is configured to acquire first predicted feature point information of the current image frame.

Where a second network model corresponding to each previous image frame is configured to acquire loop information corresponding to the previous image frame based on the first predicted feature point information of the previous image frame; and a second network model corresponding to each current image frame is configured to acquire the second predicted feature point information of the current image frame via the input loop information corresponding to the previous image frame and the input first predicted feature point information of the current image frame.

Where the model training unit further includes:

a feature point position predicting unit configured to acquire a position of a predicted feature point of the current image frame based on the first predicted feature point information of the current image frame and the second predicted feature point information of the current image frame;

a feature point position acquiring unit configured to acquire a position of actual feature points based on the current image frame;

a predicted error acquiring unit configured to acquire a predicted error of the current image frame based on the position of the predicted feature point of the current image frame and the position of the actual feature point of the current image frame; and a parameter adjusting unit configured to adjust the parameters of the first network model and the parameters of the second network model based on the predicted error.

Where the feature point position predicting unit is further configured to:

perform a weighted sum of a position of a first predicted feature point of the first predicted feature point information of the current image frame and a position of a second predicted feature point of the second predicted feature point information of the current image frame, and acquire a position of a predicted feature point of the current image frame.

Where the predicted error acquiring unit is further configured to:

calculate an error between the position of the predicted feature point of the current image frame and the position of the actual feature point of the current image frame to acquire a first error;

calculate an error between the position of the second predicted feature point of the current image frame and the position of the actual feature point of the current image frame to acquire a second error; and perform a weighted sum of the first error and the second error, acquire the predicted error of the current image frame.

According to a third aspect of the present disclosure, there is provided an apparatus for object tracking, including:

a processor; and a memory for storing instructions executable by the processor;

wherein the processor is configured to:

obtain frames with a number of N of history images of the object, wherein N is a natural number greater than or equal to 2;

acquire first predicted feature point information of each frame image by using first network models corresponding to each frame image in the frames with a number of N of history images and acquiring second predicted feature point information of the each frame image by using second network models corresponding to each frame image;

adjust parameters of the first network model and parameters of the second network model based on the first predicted feature point information and the second predicted feature point information until the first network model and the second network model are trained completely; and perform tracking of the object by using the first completely trained network model and the second completely trained network model.

According to a fourth aspect of the present disclosure, there is provided a non-temporary computer readable storage medium, wherein instructions of the storage medium are executed by a processor of a terminal, making the terminal able to execute a method for object tracking, wherein the method including:

obtaining frames with a number of N of history images of the object, wherein N is a natural number greater than or equal to 2;

acquiring first predicted feature point information of each frame image by using first network models corresponding to each frame image in the frames with a number of N of history images, and acquiring second predicted feature point information of the each frame image by using second network models corresponding to each frame image;

adjusting parameters of the first network model and parameters of the second network model based on the first predicted feature point information and the second predicted feature point information until the first network model and the second network model are trained completely; and performing tracking of the object by using the first completely trained network model and the second completely trained network model.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

DETAILED DESCRIPTION

Reference will now be made in detail to some embodiments here, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of devices and methods consistent with some aspects related to the disclosure as recited in the appended claims.

Various embodiments of the disclosure can address that object tracking require online learning may be slow in speed, resulting in not meeting current increasingly higher requirements for object tracking effects.

In some embodiments of the present disclosure, one Convolutional Neural Network (CNN) model is made correspondent to only one Long Short-Term Memory (LSTM) network model, therefore each CNN model demands only to be calculated for once, which increases training speed. Moreover, when each frame is predicted, information of all previous frames will be used, which corresponds to that context information is stored at the time of prediction, improving accuracy of prediction.

A method for object tracking in the present disclosure is described in detail below. It should be noted that the object tracking herein may be human face tracking.

Figure 1:
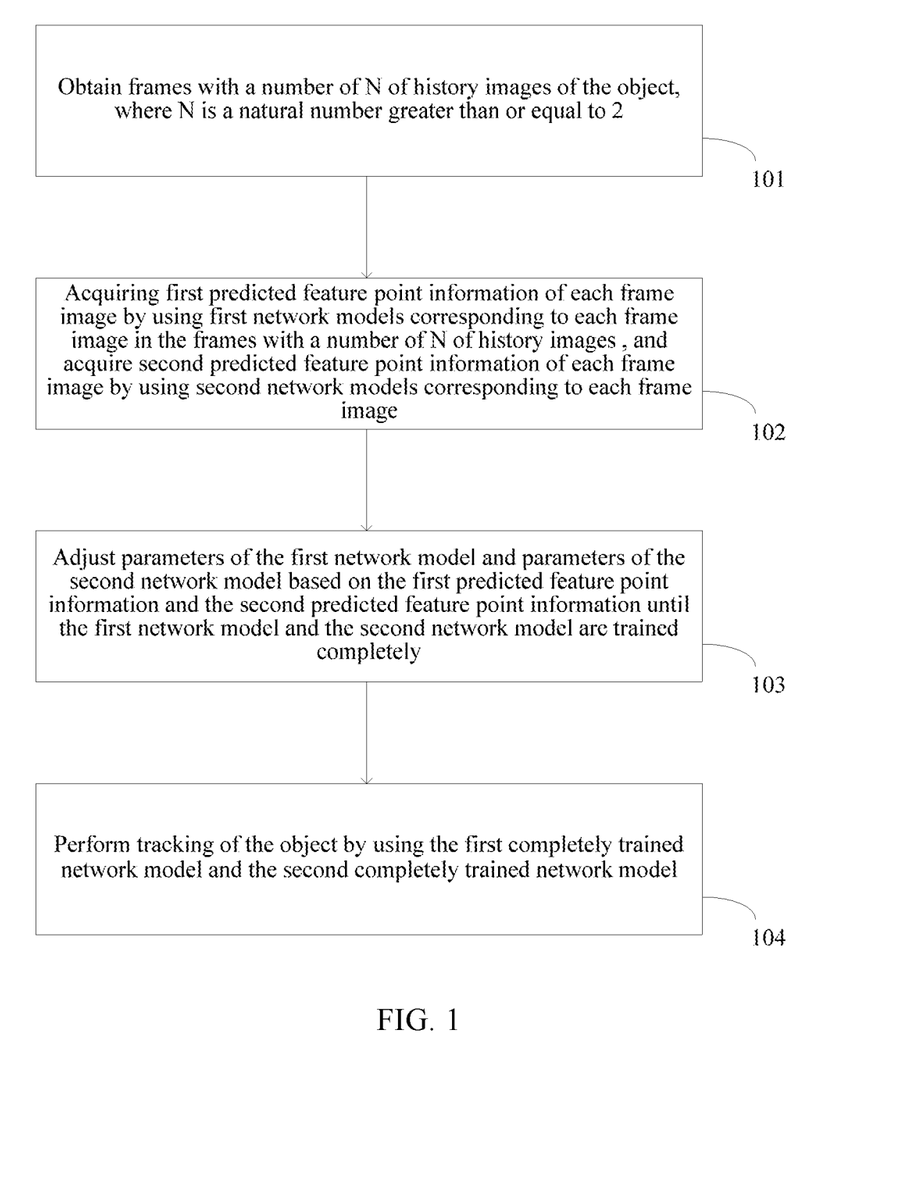
FIG. 1 shows a flow chart of a method for object tracking according to by an exemplary embodiment.

FIG. 1 is a method for object tracking shown by an exemplary embodiment, the method includes:

Step 101, obtaining frames with a number of N of history images of the object, where N is a natural number greater than or equal to 2;

Step 102, acquiring first predicted feature point information of each frame image by using a first network model corresponding to each frame image in the N-frame historical image; and acquiring second predicted feature point information of the each frame image by using a second network model corresponding to the each frame image;

Step 103, adjusting parameters of the first network model and parameters of the second network model based on the first predicted feature point information and the second predicted feature point information until the first network model and the second network model are trained completely; and Step 104, performing tracking of the object by using the first completely trained network model and the second completely trained network model.

In step 101, a history image of the object may be obtained by sampling a history video, that is, frames with a number of N of history images herein are associated frames of a video.

In step 102, the first predicted feature point information is acquired by predicting input image frames, which may include positions of feature points and acquire feature vectors according to the positions of the feature points. For instance, through inputting a human face image into the first network model, positions of 106 predicted feature points are obtained; and a 212-dimension feature vector may be obtain based on the 106 coordinates (x, y).

In some embodiments, frames with a number of N of history images at least includes a previous image frame and a current image frame, the sampling time of the previous image frame is earlier than the sampling time of the current image frame;

acquiring the first predicted feature point information of the each frame image in the frames with a number of N of history images by using a first network model corresponding to each frame image in the N-frame historical image includes:

acquiring a first predicted feature point information of the previous image frame by using a first network model corresponding to each previous image frame; and acquiring first predicted feature point information of the current image frame by using a first network model corresponding to each current image frame.

Here, when training a network model, at least two frames of images sampled from the video are necessary, and a number of image frames to be used is determined according to a specific situation. Moreover, the previous image frame may be the first frame of the frames in a number of N of history images, or may not be the first frame of the frames in a number of N of history images. The previous image frame here is relative to the current image frame, which indicating an order of sampling time of the two frames of images. The first predicted feature point information of the previous image frame includes positions of feature points and feature vectors of the predicted previous image frame and predicted by the first network model corresponding to each previous image frame, and the first predicted feature point information of the current image frame includes positions of feature points and feature vectors of the predicted current image frame and predicted by the first network model corresponding to each current image frame.

It should be noted that the first predicted feature point information of the previous image frame and the first predicted feature point information of the current image frame may be the same or may be different. Moreover, the first predicted feature point information corresponding to image frames input into the first network model, where the first predicted feature point information includes positions of feature points and feature vectors, may be output directly by the first network model.

In some embodiments, acquiring the second predicted feature point information of the each frame image by using the second network model corresponding to each frame image includes:

acquiring loop information corresponding to the previous image frame via the second network model corresponding to each previous image frame based on the first predicted feature point information of the previous image frame; and inputting the loop information corresponding to the previous image frame and the first predicted feature point information of the current image frame to the second network model corresponding to each current image frame, to acquire the second predicted feature point information of the current image frame.

Here, the first network model corresponding to each frame may be the same in model structure and parameters, and the second network model corresponding to each frame may be the same in model structure and parameters.

In the method of the present disclosure, each frame of image is performed to predict feature point information by the first network model and the second network model corresponding to each frame of image, that is, one first network model is only connected to one second network model, which improves processing speed of the first network model.

It should be noted that if the current image frame is the first frame of image of the current image frame, when acquiring loop information corresponding to the previous image frame, input of the first predicted feature point information of the previous image frame into the second network model corresponding to each previous image frame is only demanded to acquire the loop information corresponding to the previous image frame, where the loop information includes information of the previous image frame. If the current image frame is not the first frame of image of the current image frame, when acquiring loop information corresponding to the previous image frame, input of the first predicted feature point information of the previous image frame and loop information of the previous frame of image of the previous image frame into the second network model corresponding to the previous image frame are demanded, to acquire loop information corresponding to the previous image frame, where sampling time of the previous frame of image is earlier than sampling time of the previous image frame, and an interval between the sampling time of the previous frame of image and the sampling time of the previous image frame is the shortest, in this case, the loop information corresponding to the previous image frame includes information of the previous image frame and information of all image frames prior to the previous image frame. The above process may be illustrated through a neural network model with memory characteristics, which will be omitted here.

Therefore, if neural network models with memory characteristics are adopted in the second network model, when feature point information of a frame of image is predicted, information of each frame of image that is previously related to the frame of image will be considered, which increasing accuracy of prediction.

In some embodiments, adjusting the parameters of the first network model and the parameters of the second network model based on the first predicted feature point information and the second predicted feature point information includes:

acquiring a position of a predicted feature point of the current image frame based on the first predicted feature point information of the current image frame and the second predicted feature point information of the current image frame;

acquiring a position of actual feature points based on the current image frame;

acquiring a predicted error of the current image frame based on the position of the predicted feature point and the position of the actual feature point; and adjusting the parameters of the first network model and the parameters of the second network model based on the predicted error.

Where the manner of acquiring a position of actual feature points based on the current image frame may be selected from manners known to those skilled in the art, and details will be omitted herein.

In some embodiments, acquiring the position of the predicted feature point of the current image frame based on the first predicted feature point information of the current image frame and the second predicted feature point information of the current image frame includes:

performing a weighted sum of a position of a first predicted feature point of the first predicted feature point information of the current image frame and a position of a second predicted feature point of the second predicted feature point information of the current image frame, and acquiring a position of a predicted feature point of the current image frame.

Here, a position S1 of a first predicted feature point is extracted from the first predicted feature point information, a position S2 of second predicted feature point is extracted from the second predicted feature point information. The first predicted feature point S1 and the second predicted feature point S2 are performed a weighted sum by using the formula (1) as below to acquire a position S of a predicted feature point of the current image frame:

$$S = \alpha \times S1 + (1-\alpha) \times S2 \qquad (1)$$

where $\alpha$ is a weighted factor and $0 < \alpha < 1$, and the specific value of a may be set according to the actual situation.

In some embodiments, acquiring the predicted error of the current image frame based on the position of the predicted feature point and the position of the actual feature point includes:

calculating an error between the position of the predicted feature point and the position of the actual feature point to acquire a first error o;

calculating an error between the position of the second predicted feature point and the position of the actual feature point to acquire a second error; and performing a weighted sum of the first error and the second error to acquire the predicted error of the current image frame.

Concretely, the first error L1 may be calculated by calculating the Euclidean distance between the position of the predicted feature point and the position of the actual feature point, and the second error L2 may be calculated by calculating the Euclidean distance between the position of the second predicted feature point and the position of the actual feature point. For instance, the first error L1 and the second error L2 are performed a weighted sum by using the formula (2) as below to acquire the predicted error L of the current image frame:

$$L = \beta \times L1 + \gamma \times L2 \qquad (2)$$

where $\beta$ and $\gamma$ are both weighted factors, $0 < \beta < 1$, $0 < \gamma < 1$ $\beta + \gamma = 1$, and the specific values may be set according to the actual situation.

After acquiring the predicted error L, parameters of the first network model and parameters of the second network model are adjusted by using the predicted error until the first network model and the second network model are trained completely. Here, the condition that training is completed may be that the acquired predicted error L is smaller than a set threshold. Conditions for judgment of completion of model training based on the predicted error may refer to conditions for completion of training a CNN model and a LSTM model, and will be omitted here.

In some embodiments, the first network model is a convolutional neural CNN network model, and the second network model is a long-term and short-term memory LSTM network model.

A frame of image is input into a CNN network model, and positions of feature points and feature vectors of the frame image may be predicted. The predicted feature vector of the current image frame and the loop information of the previous frame are input into the LSTM network model, and information of further predicted feature point and loop information of the current frame may be obtained, where the loop information of the previous frame is output by an LSTM network model corresponding to each previous frame.

It should be noted that in the method provided by the present disclosure, a CNN model and an LSTM network model corresponding to each frame of image are provided for each frame of image, where functions of the CNN models are the same, and functions of the LSTM network models are also the same.

Figure 2:
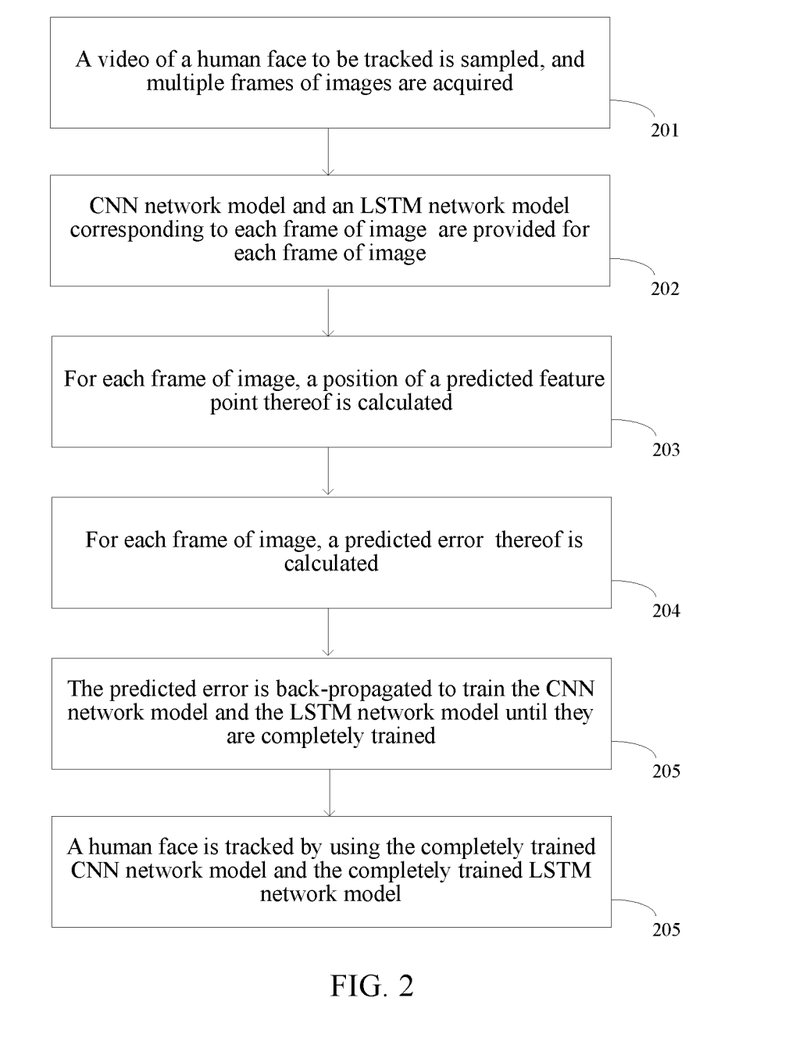
FIG. 2 shows a flow chart of a method for object tracking according to by an exemplary embodiment.

FIG. 2 shows a flow chart of a method according to an exemplary embodiment of the present application. In the method, a human face is tracked. Before it is performed to track a human face, videos in a period of previous time of the human face will be acquired. As shown in FIG. 2, the method includes the steps as below.

In step 201, a video of a human face to be tracked is sampled, and multiple frames of images are acquired.

In step 202, a CNN model and an LSTM network model corresponding to each frame of image are provided for the each frame of image, where the CNN models and an LSTM network model are set in a way that the each frame of image is input into the CNN model corresponding to the each frame of image, and feature vectors output by the CNN models are respectively input into the LSTM network models corresponding to the each frame of image. Moreover, loop information output by an LSTM network model corresponding to a previous frame of image is input into an LSTM network model corresponding to a next frame of image.

In step 203, for each frame of image, a position S of a predicted feature point is calculated by $S=0.5 \times S1 + 0.5 \times S2$.

In step 204, for each frame of image, a predicted error L is calculated by $L=L1+L2$.

In step 205, the predicted error is back-propagated to train the CNN network model and the LSTM network model until a predicted error calculated for a frame of image is less than a set threshold. At this time, the CNN model and the LSTM network model are considered to be completely trained.

In step 206, a human face is tracked by using the completely trained CNN network model and the completely trained LSTM network model.

Figure 3:
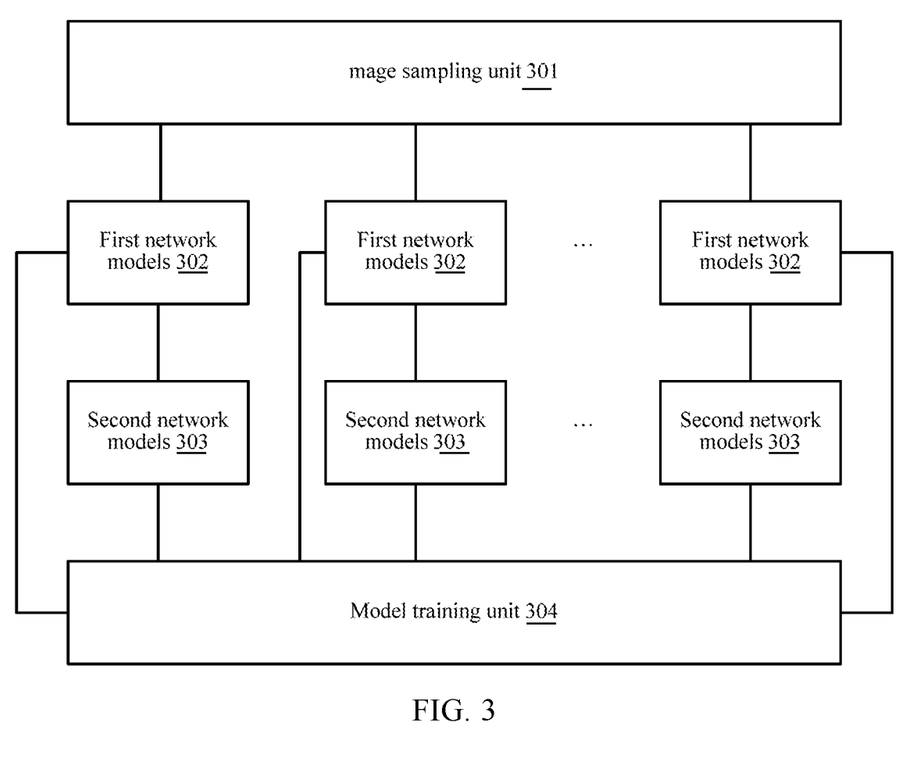
FIG. 3 shows a block diagram of an apparatus for object tracking according to by an exemplary embodiment.

In the present applicant, there is provided an apparatus for object tracking. As shown in FIG. 3, the apparatus includes:

an image sampling unit 301 configured to obtaining frames of a number of N of history images of the object, where N is a natural number greater than or equal to 2;

first network models 302 of a number of N, where each first network model is configured to acquire first predicted feature point information of each frame image corresponding to each first network model;

second network models 303 of a number of N, where each second network model is configured to acquire second predicted feature point information of each frame image corresponding to each second network model; and a model training unit 304 configured to adjust parameters of the first network model and parameters of the second network model based on the first predicted feature point information and the second predicted feature point information until the first network model and the second network model are trained completely.

In some embodiments, frames of a number of N of history images obtained by the image sampling unit 301 at least includes a previous image frame and a current image frame, the sampling time of the previous image frame is earlier than the sampling time of the current image frame;

a first network model 302 corresponding to each previous image frame is configured to acquire the first predicted feature point information of the previous image frame; and a first network model 302 corresponding to each current image frame is configured to acquire first predicted feature point information of the current image frame.

In some embodiments, a second network model 303 corresponding to each previous image frame is configured to acquire loop information corresponding to the previous image frame based on the first predicted feature point information of the previous image frame; and a second network model 303 corresponding to each current image frame is configured to acquire the second predicted feature point information of the current image frame via the input loop information corresponding to the previous image frame and the input first predicted feature point information of the current image frame.

In some embodiments, the model training unit 304 further includes:

a feature point position predicting unit configured to acquire a position of a predicted feature point of the current image frame based on the first predicted feature point information of the current image frame and the second predicted feature point information of the current image frame;

a feature point position acquiring unit configured to acquire a position of actual feature points based on the current image frame;

a predicted error acquiring unit configured to acquire a predicted error of the current image frame based on the position of the predicted feature point and the position of the actual feature point of the current image frame; and a parameter adjusting unit configured to adjust the parameters of the first network model and the parameters of the second network model based on the predicted error.

In some embodiments, the feature point position predicting unit is further configured to:

perform a weighted sum of a position of a first predicted feature point of the first predicted feature point information of the current image frame and a position of a second predicted feature point of the second predicted feature point information of the current image frame, and acquire a position of a predicted feature point of the current image frame.

In some embodiments, the predicted error acquiring unit is further configured to:

calculate an error between the position of the predicted feature point of the current image frame and the position of the actual feature point of the current image frame, acquire a first error;

calculate an error between the position of the second predicted feature point of the current image frame and the position of the actual feature point of the current image frame, acquire a second error; and perform a weighted sum of the first error and the second error, acquire the predicted error of the current image frame.

In some embodiments, the first network model 302 is a convolutional neural CNN network model and the second network model 303 is a long-term and short-term LSTM network model.

As to the apparatus in the above described embodiments, specific manners in which each module thereof performs an operation has been described in detail in the embodiments related to the method, and will not be explained in detail herein.

As such, in some embodiments of the present disclosure, each frame of image is performed to predict feature point information by the first network model and the second network model corresponding to each frame of image, that is, one first network model is only connected to one second network model, which improves processing speed of the first network model. Furthermore, if neural network models with memory characteristics are adopted in the second network model, when feature point information of a frame of image is predicted, information of each frame of image that is previously related to the frame of image will be considered, which increasing accuracy of prediction.

Figure 4:
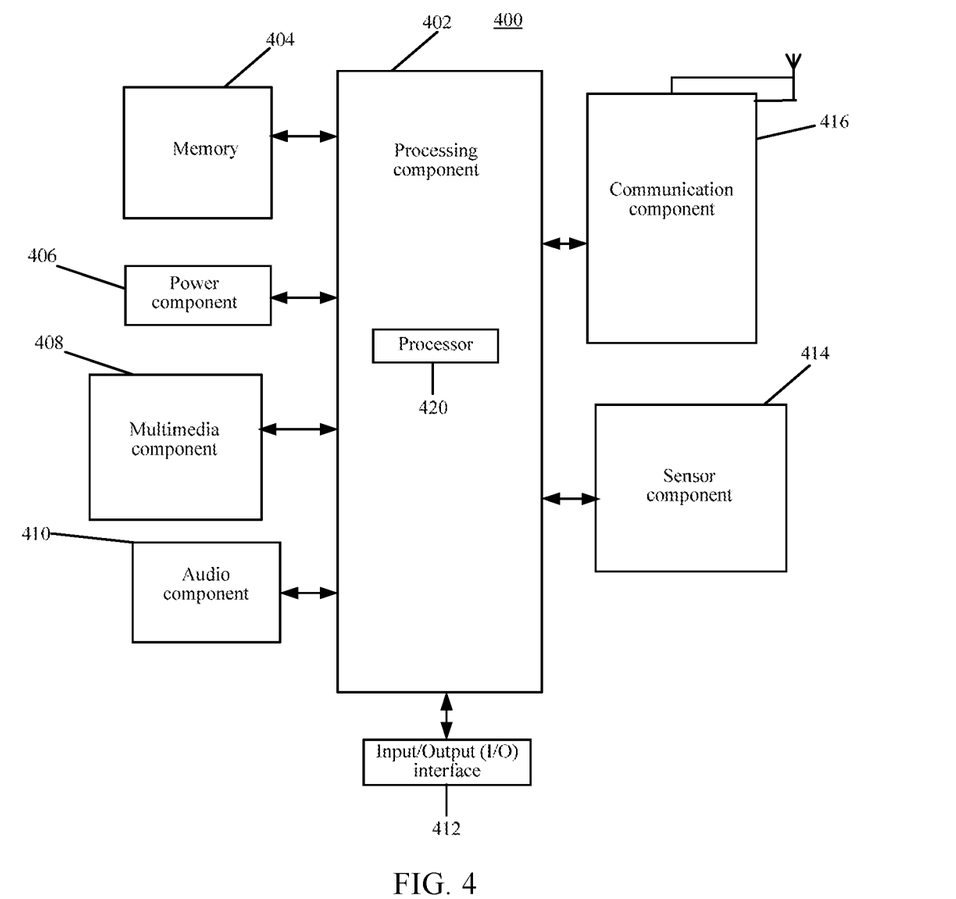
FIG. 4 shows a block diagram of an apparatus according to by an exemplary embodiment.

FIG. 4 is a block diagram of an apparatus 400 used for prompt according to an exemplary embodiment. For example, the apparatus 400 may be a mobile phone, a computer, a digital broadcast terminal, a messaging device, a game console, a tablet device, a medical device, a fitness device, a personal digital assistant and the like.

Referring to FIG. 4, the apparatus 400 may include one or more of the following components: a processing component 402, a memory 404, a power component 406, a multimedia component 408, an audio component 410, an Input/Output (I/O) interface 412, a sensor component 414 and a communication component 416.

The processing component 402 typically controls overall operations of the apparatus 400, such as the operations associated with display, phone call, data communications, camera operations and recording operations. The processing component 402 may include one or more processors 420 to execute instructions, to perform all or part of the steps of the above described method.

Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, telephone directory data, messages, pictures, video, etc.

The memory 404 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 406 supplies power to various components of the apparatus 400. The power component 406 may include a power management system, one or more power supplies and any other components associated with generation, management, and distribution of power in the apparatus 400.

The multimedia component 408 includes a screen providing an output interface between the apparatus 400 and the user. In some embodiments, the screen may include a Liquid Crystal Display (LCD) and a Touch Panel (TP). In some embodiments, an organic light-emitting diode (OLED) display or other types of display screens can be adopted.

If the screen includes a touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense duration and pressure associated with the touch or the swipe action.

In some embodiments, the multimedia component 408 includes a front camera and/or a rear camera. When the apparatus 400 is in an operation mode, such as a shooting mode or a video mode, the front camera and/or the rear camera may receive external multimedia data. Each front and rear camera may be a fixed optical lens system or have focal length and optical zoom capability The audio component 410 is configured to output and/or input audio signals. For example, the audio component 410 includes a microphone (MIC) configured to receive an external audio signal when the apparatus 400 is in an operation mode, such as a call mode, a recording mode and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons and the like. These buttons may include, but are not limited to, a home button, a volume button, a start button, and a lock button.

The sensor component 414 includes one or more sensors to provide status assessments of various aspects of the apparatus 400. For instance, the sensor component 414 may detect an on/off status of the apparatus 400, relative positioning of components, e.g., the display and the keypad of the apparatus 400; the sensor component 414 may further detect a change in position of the apparatus 400 or a component of the apparatus 400, a presence or absence of user contact with the apparatus 400, an orientation or an acceleration/deceleration of the apparatus 400 and a change in temperature of the apparatus 400.

The sensor component 414 may include a proximity sensor configured to detect presence of nearby objects without any physical contact. The sensor component 414 may also include a light sensor, such as a CMOS or CCD image sensor configured to use in imaging applications. In some embodiments, the sensor component 414 may also include an accelerometer sensor, a gyroscope sensor, a magnetic sensor, a pressure sensor or a temperature sensor.

The communication component 416 is configured to facilitate communication, wired or wirelessly, between the apparatus 400 and other devices. The apparatus 400 may access a wireless network based on a communication standard, such as Wi-Fi, 2G, 3G, 4G, or 5G, or a combination thereof. In one exemplary embodiment, the communication component 416 receives a broadcast signal or broadcast associated information from an external broadcast management system via a broadcast channel. In one exemplary embodiment, the communication component 416 further includes a Near Field Communication (NFC) module to facilitate short-range communications.

For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In some embodiments, the apparatus 400 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, to perform the above described method.

In some embodiments, there is also provided a non-temporary computer-readable storage medium including instructions, such as the memory 404 including instructions, the above described instructions may be executable by a processor 420 in the apparatus 400 to perform the above described method. For example, the non-temporary computer-readable storage medium may be a ROM, a Random-Access Memory (RAM), a CD-ROM, a magnetic tape, a floppy disc, an optical data storage device and the like.

A non-temporary computer readable storage medium, when instructions in the storage medium are executed by a processor of a terminal, which makes the terminal able to execute a method for object tracking, where the method includes: obtaining frames with a number of N of history images of the object, wherein N is a natural number greater than or equal to 2; acquiring first predicted feature point information of each frame image in the frames with a number of N of history images by using first network models corresponding to each frame image and acquiring second predicted feature point information of the each frame image by using second network models corresponding to each frame image; adjusting parameters of the first network model and parameters of the second network model based on the first predicted feature point information and the second predicted feature point information until the first network model and the second network model are trained completely; and performing tracking of the object by using the first completely trained network model and the second completely trained network model.

Figure 5:
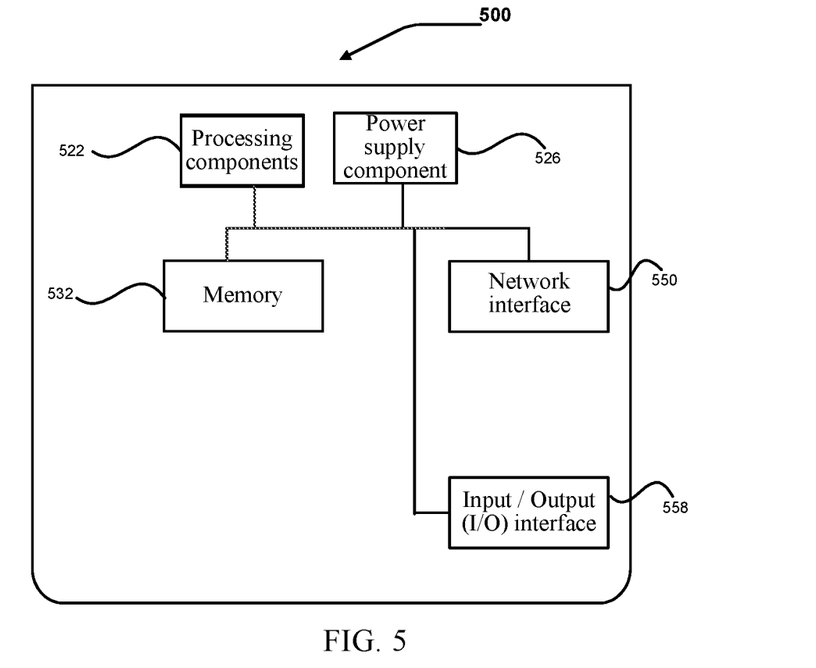
FIG. 5 shows a block diagram of an apparatus according to by an exemplary embodiment.

FIG. 5 shows a block diagram showing an apparatus 500 used for prompt according to an exemplary embodiment. For example, apparatus 500 can be provided as a server. Referring to FIG. 5, the apparatus 500 includes processing components 522, which further includes one or more processors and a memory resource represented by a memory 532, for storing instructions, such as applications, executable by the processing components 522.

The applications stored in the memory 532 may include one or more modules, each of which corresponds to a group of instructions. Furthermore, the processing components 522 is configured to execute instructions to perform the following method: obtaining frames with a number of N of history images of the object, where N is a natural number greater than or equal to 2; acquiring first predicted feature point information of each frame image by using first network models corresponding to each frame image in the frames with a number of N of history images, and acquiring second predicted feature point information of the each frame image by using second network models corresponding to each frame image; adjusting parameters of the first network model and parameters of the second network model based on the first predicted feature point information and the second predicted feature point information until the first network model and the second network model are trained completely; and performing tracking of the object by using the first completely trained network model and the second completely trained network model.

The apparatus 500 may also include a power supply component 526 configured to perform power management on the apparatus 500, a wired or wireless network interface 550 configured to connect the apparatus 500 to the network and an Input/Output (I/O) interface 558. The apparatus 500 may be operated based an operating system, such as Windows Server™, Mac OS X™, Unix™, Linux™ and FreeBSD™, stored in the memory 532.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for object tracking, comprising:
   obtaining frames with a number of N of history images of the object, wherein N is a natural number greater than or equal to 2;
   acquiring first predicted feature point information of each frame image by using first network models each corresponding to a frame image in the frames with a number of N of history images, and acquiring second predicted feature point information of each frame image by using second network models each corresponding to a frame image;
   adjusting parameters of the first network models and parameters of the second network models based on the first predicted feature point information and the second predicted feature point information until the first network models and the second network models are trained completely; and
   performing tracking of the object by using the first completely trained network models and the second completely trained network models;
   wherein said adjusting the parameters of the first network models and the parameters of the second network models based on the first predicted feature point information and the second predicted feature point information comprises:
   acquiring a position of a predicted feature point of a current image frame based on the first predicted feature point information of the current image frame and the second predicted feature point information of the current image frame;
   acquiring a position of an actual feature point based on the current image frame;
   acquiring a predicted error of the current image frame based on a position of the predicted feature point and a position of the actual feature point; and
   adjusting the parameters of the first network models and the parameters of the second network models based on the predicted error.

2. The method according to claim 1, wherein the frames with a number of N of history images at least comprise a previous image frame and the current image frame, a sampling time of the previous image frame is earlier than a sampling time of the current image frame;
   said acquiring the first predicted feature point information comprises:
   acquiring first predicted feature point information of the previous image frame by using the first network models each corresponding to each previous image frame; and
   acquiring first predicted feature point information of the current image frame by using the first network models each corresponding to each current image frame.

3. The method according to claim 2, wherein said acquiring the second predicted feature point information comprises:
   acquiring loop information corresponding to the previous image frame via the second network models each corresponding to each previous image frame based on the first predicted feature point information of the previous image frame; and inputting the loop information corresponding to the previous image frame and the first predicted feature point information of the current image frame into the second network models each corresponding to each current image frame, to acquire the second predicted feature point information of the current image frame.

4. The method according to claim 1, wherein said acquiring the second predicted feature point information comprises:

acquiring loop information corresponding to the previous image frame via the second network models each corresponding to each previous image frame based on the first predicted feature point information of the previous image frame; and inputting the loop information corresponding to the previous image frame and the first predicted feature point information of the current image frame into the second network models each corresponding to each current image frame, to acquire the second predicted feature point information of the current image frame.

5. The method according to claim 1, wherein said acquiring the position of the predicted feature point of the current image frame comprises:

performing a weighted sum of a position of a first predicted feature point of the first predicted feature point information of the current image frame and a position of a second predicted feature point of the second predicted feature point information of the current image frame, and acquiring a position of a predicted feature point of the current image frame.

6. The method according to claim 1, wherein said acquiring the predicted error of the current image frame:

calculating an error between the position of the predicted feature point of the current image frame and the position of the actual feature point to acquire a first error;

calculating an error between the position of the second predicted feature point of the current image frame and the position of the actual feature point to acquire a second error; and performing a weighted sum of the first error and the second error to acquire the predicted error of the current image frame.

7. An apparatus implementing the method according to claim 1, wherein one first network model is only connected to one second network model to thereby improve processing speed of the one first network model.

8. The apparatus according to claim 7, wherein neural network models with memory characteristics are adopted in the one second network model.

9. The apparatus according to claim 8, wherein upon feature point information of the each frame image is predicted, information of each frame image that is previously related to the each frame of image will be considered, thereby increasing accuracy of prediction.

10. The apparatus according to claim 9, further comprising a camera for obtaining the frames.

11. An apparatus for object tracking, comprising:

an image sampling unit configured to obtain frames with a number of N of history images of the object, wherein N is a natural number greater than or equal to 2;

first network models with a number of N, wherein each first network model is configured to acquire first predicted feature point information of each frame image corresponding to the each first network model;

second network models with a number of N, wherein each second network model is configured to acquire second predicted feature point information of each frame image corresponding to the each second network model; and model training unit configured to adjust parameters of the first network models and parameters of the second network models based on the first predicted feature point information and the second predicted feature point information until the first network models and the second network models are trained completely;

wherein the model training unit further comprises:

a feature point position predicting unit configured to acquire a position of a predicted feature point of the current image frame based on the first predicted feature point information of the current image frame and the second predicted feature point information of the current image frame;

a feature point position acquiring unit configured to acquire a position of an actual feature point based on the current image frame;

a predicted error acquiring unit configured to acquire a predicted error of the current image frame based on the position of the predicted feature point of the current image frame and the position of the actual feature point of the current image frame; and a parameter adjusting unit configured to adjust the parameters of the first network models and the parameters of the second network models based on the predicted error.

12. The apparatus according to claim 11, wherein the frames with a number of N of history images obtained by the image sampling unit at least comprise a previous image frame and the current image frame, a sampling time of the previous image frame is earlier than a sampling time of the current image frame;

the each first network model corresponding to each previous image frame is configured to acquire first predicted feature point information of the previous image frame; and the each first network model corresponding to each current image frame is configured to acquire first predicted feature point information of the current image frame.

13. The apparatus according to claim 12, wherein the each second network model corresponding to each previous image frame is configured to acquire loop information corresponding to the previous image frame based on the first predicted feature point information of the previous image frame; and the each second network model corresponding to each current image frame is configured to acquire the second predicted feature point information of the current image frame via the input loop information corresponding to the previous image frame and the input first predicted feature point information of the current image frame.

14. The apparatus according to claim 11, wherein the each second network model corresponding to each previous image frame is configured to acquire loop information corresponding to the previous image frame based on the first predicted feature point information of the previous image frame; and the each second network model corresponding to each current image frame is configured to acquire the second predicted feature point information of the current image frame via the input loop information corresponding to the previous image frame and the input first predicted feature point information of the current image frame.

15. The apparatus according to claim 11, wherein the feature point position predicting unit is further configured to perform a weighted sum of a position of a first predicted feature point of the first predicted feature point information of the current image frame and a position of a second predicted feature point of the second predicted feature point information of the current image frame, and acquire a position of a predicted feature point of the current image frame.

16. The apparatus according to claim 11, wherein the predicted error acquiring unit is further configured to calculate an error between the position of the predicted feature point of the current image frame and the position of the actual feature point of the current image frame to acquire a first error;
   calculate an error between the position of the second predicted feature point of the current image frame and the position of the actual feature point of the current image frame to acquire a second error; and
   perform a weighted sum of the first error and the second error to acquire the predicted error of the current image frame.

17. An apparatus for object tracking, comprising:
a processor; and
memory for storing instructions executable by the processor;
wherein the processor is configured to:
obtain frames with a number of N of history images of the object, wherein N is a natural number greater than or equal to 2;
acquire first predicted feature point information of each frame image by using first network models each corresponding to each frame image in the frames with a number of N of history images, and acquiring second predicted feature point information of the each frame image by using second network models each corresponding to each frame image;
adjust parameters of the first network models and parameters of the second network models based on the first predicted feature point information and the second predicted feature point information until the first network models and the second network models are trained completely; and
perform tracking of the object by using the first completely trained network models and the second completely trained network models;
wherein said adjusting the parameters of the first network models and the parameters of the second network models based on the first predicted feature point information and the second predicted feature point information comprises:
acquiring a position of a predicted feature point of the current image frame based on the first predicted feature point information of the current image frame and the second predicted feature point information of the current image frame;
acquiring a position of an actual feature point based on the current image frame;
acquiring a predicted error of the current image frame based on a position of the predicted feature point and a position of the actual feature point; and
adjusting the parameters of the first network models and the parameters of the second network models based on the predicted error.

* * * * *